July 21, 1953     E. W. BOTTUM     2,646,061
FLUSH TYPE HUMIDIFIER
Filed Aug. 19, 1947     3 Sheets-Sheet 2
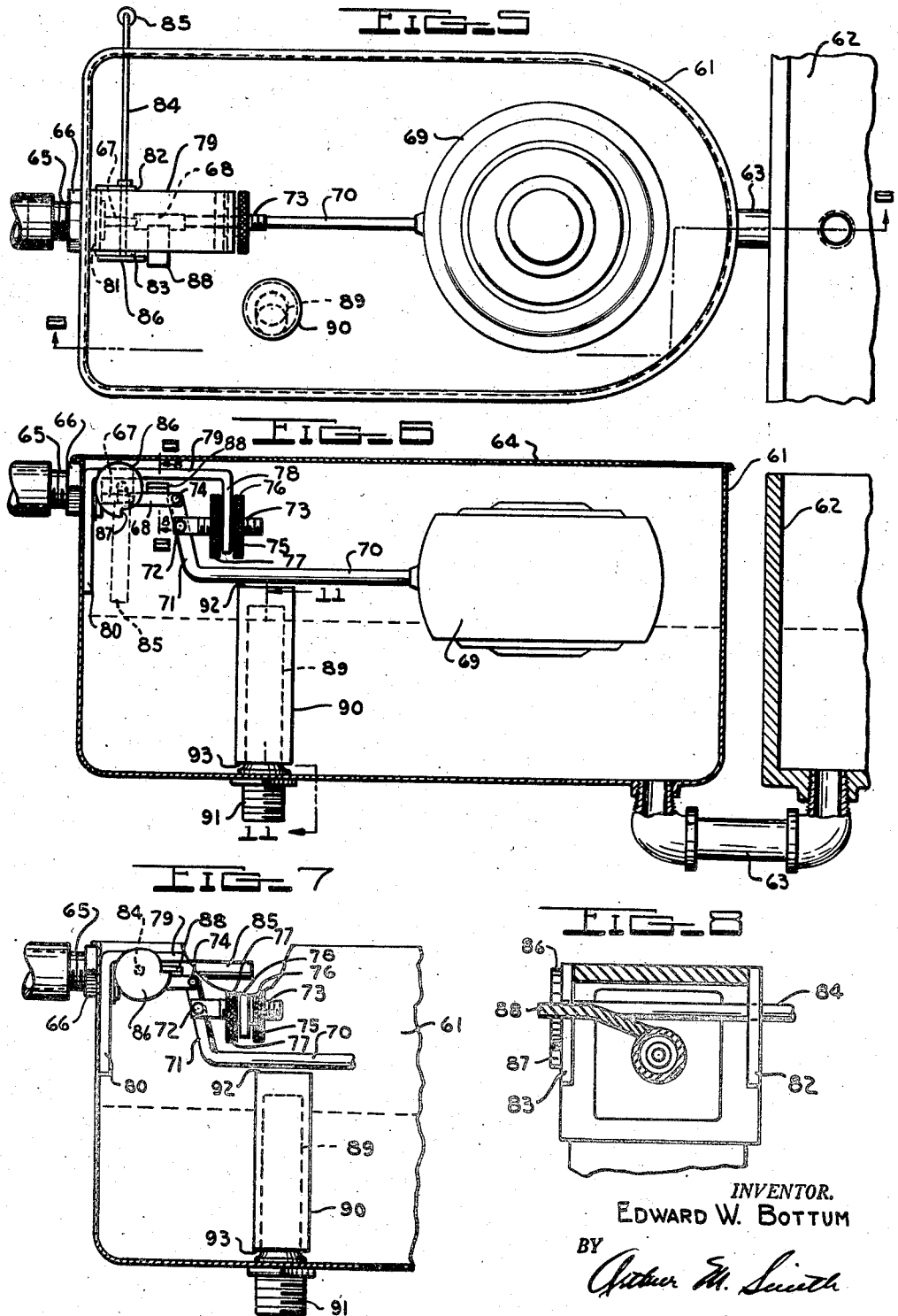
INVENTOR.
EDWARD W. BOTTUM
BY
ATTORNEY

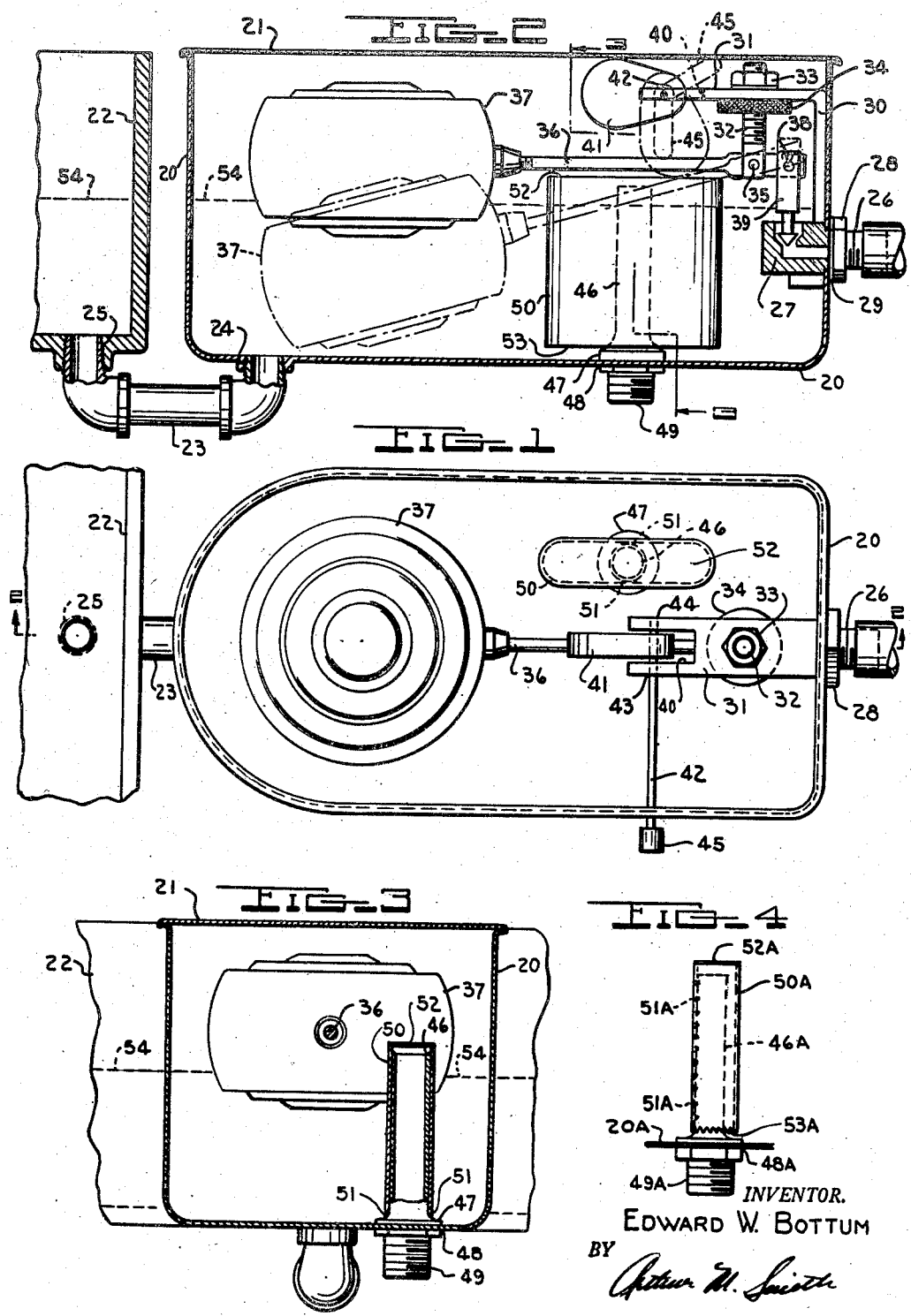

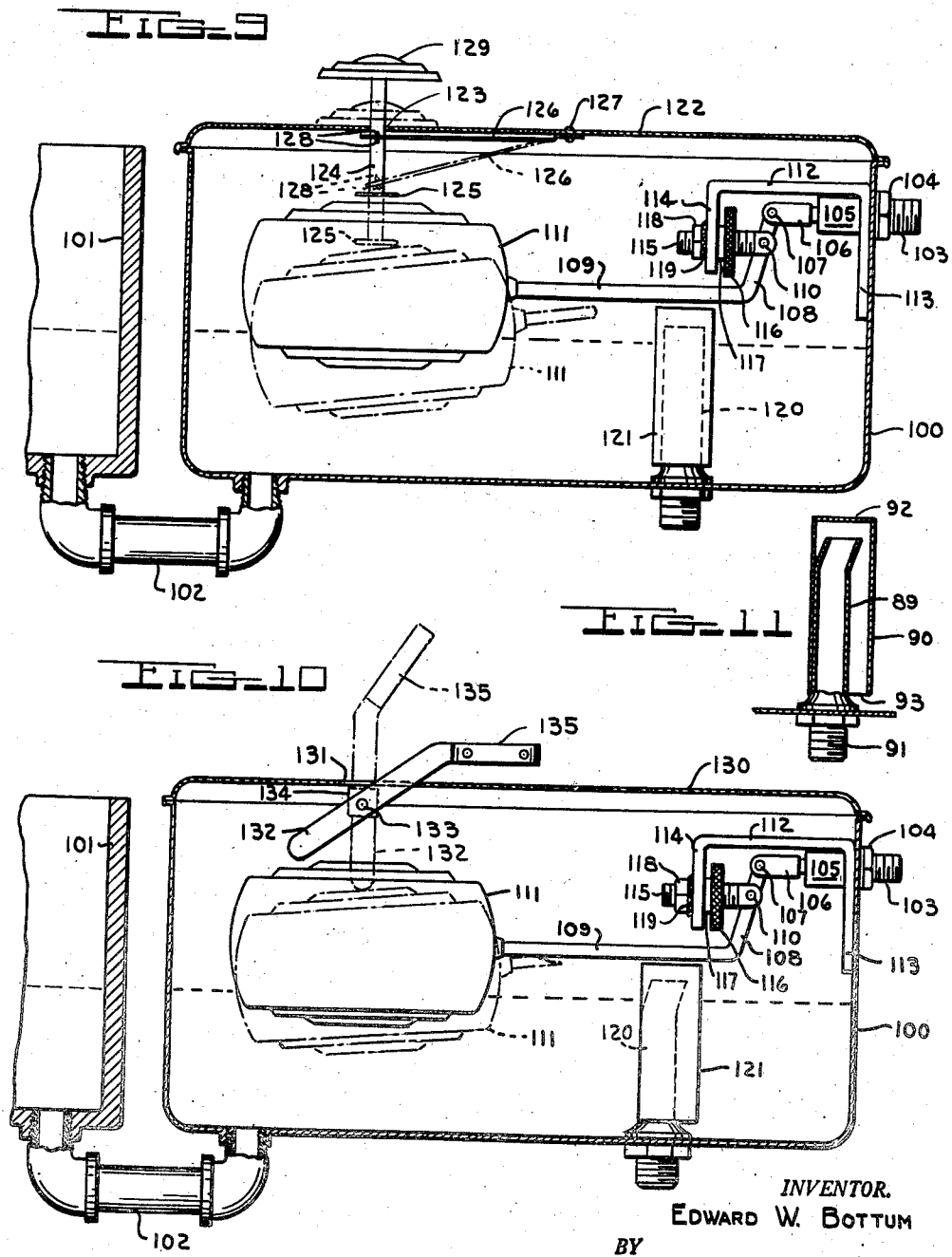

Patented July 21, 1953

2,646,061

UNITED STATES PATENT OFFICE 2,646,061

FLUSH TYPE HUMIDIFIER

Edward W. Bottum, Detroit, Mich., assignor to Skuttle Manufacturing Company, Detroit, Mich., a corporation of Michigan Application August 19, 1947, Serial No. 769,447

1 Claim. (Cl. 137—142)

The present invention relates to a flushing apparatus for cleaning a liquid container of accumulated sludge and surface scum by flushing, draining, and refilling the container, the apparatus being particularly but not exclusively adapted for periodic flushing, draining, and refilling a humidifier evaporator pan and its associated float tank.

Numerous operations and processes involving liquids maintained at an essentially constant level, as by a conventional float controlled valve mechanism for example, are frequently troubled by the accumulation of sludge or sediment on the bottom of the container and around valve fittings and other accessories, or a scum or crust at the liquid surface, particularly where the liquid is subject to rapid evaporation, as in water-filled humidifier pans wherein the water is preferably maintained at temperatures between 100° F. and 212° F. to expedite evaporation.

In such humidifier pans, the accumulated sludge and surface scum are obviously objectionable in that the sludge serves to insulate the water from its heating source and the scum retards evaporation. The high concentration of salts and other impurities left in the humidifier pan after prolonged evaporation works into the capillary members or wicks which are frequently provided by the humidifier to increase its evaporating surface, retarding their capillary action and the rate of evaporation from their surfaces. In time, the cost of maintenance of the humidifier is increased and its efficiency is reduced. In addition, the chemical constituent of the sludge or sediment and the high concentration of the dissolved salts which eventually accumulate within the evaporator pan result in chemical and electrolytic actions which rapidly corrode and deteriorate the humidifier equipment, particularly the water inlet valve fittings. If the condition is not corrected, the pan will be filled with solid precipitate which will plug the water inlet and completely stop the humidifying action.

In order to avoid the objectionable precipitate and the high concentration of dissolved salts within the humidifier equipment, frequent cleaning thereof is necessary. Nevertheless, the average householder will seldom if ever trouble himself to clean and flush his humidifier equipment as frequently as necessary. The operating efficiency of the equipment soon drops, expensive repairs and the untimely replacement of parts becomes necessary, the owner of the equipment becomes dissatisfied, and sales of otherwise meritorious equipment are lost.

Primary objects of the present invention are to provide a simple and inexpensive apparatus for flushing, draining, and refilling containers, particularly but not exclusively adapted for humidifier use and provided for standing liquids at essentially constant levels; and to provide such an apparatus cooperable with a float controlled liquid level regulating means, which may be readily adapted for automatic or semi-automatic flushing, draining, and refilling the float tank and any additional tank connected therewith, so as to break and remove accumulated sludge, surface scum, and salt concentrations from the container, valve fittings, and other accessory equipment in contact with the liquid.

Other objects of the present invention are to provide an improved siphon means adapted to permit raising of the level of the liquid in the container appreciably above its normal operating level, thereby breaking and dislodging accumulated sludge from around the edges of the container and accessory equipment and the surface of the liquid, thereafter to drain the liquid automatically and rapidly from the container, and then to stop the draining process sharply to permit refilling of the container to its normal operating level with fresh liquid.

In humidifier applications where water is continually being lost by evaporation, and an essentially constant water level is maintained in the humidifier pan, as by a float controlled inlet valve for example, the constant slow seepage of incoming water around the inlet valve fittings permits an accumulation of water impurities to collect around the valve fittings, which in turn rapidly corrode the valve parts by chemical and electrolytic actions.

Accordingly, another object of the present invention is to provide such a flushing and draining apparatus which is particularly but not exclusively adapted for humidifier use, and which may be conveniently operated periodically to flush and drain the humidifier pan and to open the water inlet valve sufficiently to wash accumulated impurities from around the inlet valve fittings and adjacent structures by a strong flow of incoming water.

Other objects of this invention will appear in the following description and appended claims, reference being had to the accompanying drawings forming a part of this specification wherein like reference characters designate corresponding parts in the several views.

In the drawings:

Fig. 1 is a fragmentary top view showing a humidifier float tank and flushing apparatus embodying the present invention, the float tank cover being removed and a fragmentary portion of the humidifier evaporator pan being shown connected with the float tank.

Fig. 2 is essentially a fragmentary vertical section taken in the direction of the arrows substantially along the line 2—2 of Fig. 1, the float tank cover being shown in position.

Fig. 3 is essentially a fragmentary vertical section through the siphon and taken in the direction of the arrows along the broken line 3—3 of Fig. 2.

Fig. 4 is essentially an elevation of a modified form of siphon suitable for use with the present invention, a fragment of the bottom of the float tank being shown in section.

Fig. 5 is a fragmentary top view showing a modified humidifier float tank and flushing apparatus embodying the present invention, the float tank cover being removed and a fragmentary portion of the humidifier evaporator pan being shown connected with the float tank.

Fig. 6 is essentially a fragmentary vertical section taken in the direction of the arrows along the broken line 6—6 of Fig. 5, the float tank cover being shown in position.

Fig. 7 is essentially a fragmentary view of the section shown in Fig. 6, the float-depressing mechanism being shown in the float-depressing position and a portion of the float tank being broken away to show the float-depressing handle.

Fig. 8 is an enlarged fragmentary vertical section, showing details of the float-depressing mechanism, and being taken in the direction of the arrows essentially along the line 8—8 of Fig. 6.

Fig. 9 is a fragmentary vertical section through a float tank and humidifier evaporator pan showing another embodiment of a flushing apparatus employing the present invention.

Fig. 10 is a fragmentary vertical section through a float tank and humidifier evaporator pan showing still another embodiment of a flushing apparatus employing the present invention.

Fig. 11 is a fragmentary vertical section through the siphon and taken in the direction of the arrows essentially along the broken line 11—11 of Fig. 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present invention is particularly important in applications wherein a standing liquid is maintained essentially at a constant level over relatively long periods of time and wherein surface scum is inclined to form on the liquid, or wherein sludge or precipitate is inclined to settle within the container and around valve fittings and the like. It is the purpose of the present invention first to raise the level of the liquid within the container to a discharge level, so as to break the surface scum thereof and to dislodge the accumulated precipitate. Many means of raising the liquid level will suggest themselves to skilled technicians, an obvious means being to open the liquid inlet valve temporarily. After suitably raising the liquid level, dislodging the sludge and breaking the surface scum, the liquid is then rapidly discharged from the bottom of the container, together with the dislodged accumulated sludge and broken surface scum. Likewise, various means for rapidly discharging the liquid from the container, in response to raising the liquid level to the discharge level, may be devised by the skilled technician. One such means which has been particularly successful for use with the present invention and is preferred for its simplicity, efficiency, and economy in operation, employs a siphon described in detail herein.

Referring to the drawings, the present invention is shown in application with a humidifier apparatus wherein the float tank 20, having the detachable cover 21, is connected to the furnace tray or evaporating pan 22 by means of the pipe connection 23 which makes attachments at 24 and 25, as by welding, soldering, or by a screw-threaded connection, through the bottoms of the float tank 20 and evaporator pan 22 respectively. Although the present invention is described by way of example in application with humidifier equipment, for which it is particularly suited, it will be apparent to those skilled in the art that the present invention may be employed in many other applications. Inasmuch as many types of well known humidifier installations may feasibly employ the present invention, details of the humidifier equipment are not discussed herein.

It is customary to place the humidifier evaporating pan 22 within the furnace heating chamber or hot air duct which delivers the heated air to be humidified from the furnace to various portions of a building. As conventionally installed, the evaporating pan 22 and float tank 20 are frequently constructed in different units, connected as by the pipe 23 to permit a free flow of water from one tank to the other. The evaporating tray 22 may be within the hot air duct, and the float tank 20 may be conveniently mounted outside of the hot air duct for accessibility. It will also be observed that the float tank 20 and the evaporating tray 22 may be combined as a single tank or unit for the purposes of the present invention.

The float tank 20 provides the water inlet duct 26 which projects through the side of the tank 20 and delivers water to the valve 27. In the present instance, the inlet duct 26 is tightly secured to the side of the tank 20 at a leakproof seal by the nut 28 and gasket 29 on the external projection of the duct 26. The internal projection of the duct 26 extends through an opening provided therefor in the vertical bracket arm 30, which latter is suitably secured to the right side of the tank 20 and completes a right angle bracket with the horizontal inward projecting arm 31.

Extended through a hole provided therefor in the horizontal arm 31 is the screw-threaded depending shaft 32 which is secured to the arm 31 from above by the retaining nut 33 and from below by the knurled nut 34. The lower end of the shaft 32 is pivotally secured at the horizontal pivot 35 to the float arm 36, which makes a screw-threaded attachment at one end to the float 37 and is pivotally secured at its other end at 38 to the upper portion of the vertically movable plunger arm 39. The plunger 39 extends downward into the inlet valve 27 for opening and closing the latter in accordance with downward or inward pivotal movement respectively of the float 37. The present invention may be suitably used with many conventional and well known types of float operated valves. Accordingly, details of the inlet valve 27 are not described herein.

The extreme left end of the bracket arm 31, Fig. 1, provides the slot 40 for the movable cam 41, which latter is rigidly secured to the horizontal shaft 42 for pivotal movement therewith. The shaft 42 extends through the cam 41, is pivotally connected to the arm 31 at 43 and 44 on opposite sides of the slot 40, and extends through the side wall of the tank 20 to an attachment with the weighted handle 45. The handle 45 is rigidly secured to the shaft 42 at right angles to the cam 41 and is weighted sufficiently to hang essentially perpendicularly downward with the axis of symmetry of the cam 41 essentially horizontal and above the float arm 36, Figs. 1 and 2. Upon pivoting the handle 45 counter-clockwise through approximately 90°, the rounded end portion of the cam 41 will contact and depress the float arm 36, phantom view in Fig. 2.

Extending upward through the bottom of the float tank 20 is the vertical siphon discharge duct 46 having an open upper end and providing the lower flange 47 which rests on the bottom of the float tank 20. Leakage of water from the bottom of the pan 20 around the duct 46 is prevented by soldering or welding, or by means of the gasket 48 which is preferably tightly secured to the bottom of the tank pan 20 by a bolt, not shown, screwed on the external screw-threaded portion 49 of the duct 46, which latter also permits connection of the duct 46 to a sewer or drain pipe by conventional practice. The siphon apparatus is completed by the inverted container or siphon chamber 50 which fits over and is secured to opposite sides 51 of the discharge duct 46, as by welding or soldering for example. The siphon chamber 50 provides the closed top 52 spaced slightly above the open upper end of the discharge duct 46 so as to allow a free flow of water and particles of scum and sludge within the water to flow into the open upper or receiving end of the discharge duct 46. The entire lower portion of the chamber 50 is open at 53 around the discharge duct 46 and is spaced slightly from the bottom of the float tank 20 to permit water and broken particles of sludge and scum from the float tank 20 to flow freely through the open bottom 53 into the chamber 50.

It will be apparent from the structure shown that the float 37 is free for pivotal up and down movement about the pivot 35 so as to impart a corresponding down and up movement of the plunger arm 39, thereby to close and open the inlet valve 27. The inlet valve 27 is adapted to open its full extent when the float 37 is at the lowered position near the bottom of the float tank 20, as shown in phantom, Fig. 2. As the float 37 is raised to the position shown in Fig. 2, the plunger arm 39 will be moved down and the inlet valve 27 will be closed or essentially closed as desired.

The pivot 35 may be adjusted vertically by setting the nuts 33 and 34. Thus the normal operating water level 54 within the tank 20 and the evaporator tray 22, at which the inlet valve 27 is closed or essentially closed, may be selectively raised or lowered. For example, with the float 37 in the raised position, Fig. 2, and with the valve 27 closed, upon loosening the knurled nut 34 from the bracket arm 31 and by tightening the nut 33 correspondingly, the pivot 35 and plunger arm 39 will be raised, and the inlet valve 27 will be opened. The water level indicated by the dotted line 54 will necessarily rise until the float is again raised to the position of closure of the valve 27.

It is also to be observed that a relatively small vertical movement of the pivot 35 will result in a relatively large change in the normal operating water level 54, since the portion of the float arm 36 to the right of the pivot 35 is relatively short compared to the portion of the arm 36 to the left thereof. During normal operation, the water level 54 will rise until the float controlled valve 27 is completely closed, which level will be somewhat below the upper inlet opening of the discharge duct 46, Figs. 2 and 3. As water is lost by evaporation from the evaporating tray 22, the float 37 will be slightly lowered, the plunger 39 will be raised, and a seepage of water past the inlet valve 27 will replace the water lost by evaporation and again close the valve 27.

As stated above, the prolonged evaporation of water from the tray 22 will result in a high concentration of the impurities which normally exist in small quantities in practically any city water. The water level 54 being maintained essentially constant, an unbroken scum or crust frequently forms across the water surface. Heavier particles form in a sludge or scale at the bottom and along the sides of the float tank 20, the evaporator tray 22, and accessory equipment below the water level 54. Likewise, concentrations of salts, such as alum which is frequently added to city water in the purification process to precipitate suspensoids, will set up corrosive chemical and electrolytic actions which rapidly deteriorate the humidifier apparatus, causing particular corrosion and damage to the brass fittngs of the inlet valve 27, preventing efficient operation of the float controlled mechanism and necessitating frequent replacement of parts.

Although it is well known that frequent flushing of the humidifier apparatus will remove the accumulated scum, sludge and salt concentrations and prevent corrosion of the valve parts and other elements of the humidifier, in the usual instance the householder or owner of the humidifier apparatus will not trouble himself to periodically clean and flush the apparatus.

The present invention has reduced the effort required by the householder in flushing and cleaning his humidifier equipment to a minimum. He is only required at intervals of once a day or once a week, depending upon the normal purity of the water, to turn the lever 45 through a 90° counter-clockwise angle and thereby to depress the float arm 36 beneath the rounded lower edge of the cam 41, phantom view, Fig. 2. In the depressed position of the float 37, the buoyancy of the water at the normal operating level 54 will press the arm 36 upward against the rounded bottom of the cam 41 with sufficient force to hold the latter in its downward position against the restoring force of the weighted lever 45.

With the float 37 in the depressed position, the inlet valve 27 will be partially open. The resulting initial rising of the level of the water within the float tank 20 and evaporator tray 22 serves the important function of dislodging and breaking the surface scum and accumulated sludge from around the sides of the containers and humidifier equipment. As the water level within the tank 20 rises, it also rises within the siphon chamber 50 to the level of the open top of the discharge duct 46. At this level, it might be expected at first thought that any further rise in the water level would overflow the discharge duct 46. However, by virtue of the chamber 50, the water therein is effectively shielded from the disturbing effects of currents set up by the incoming water through the inlet valve 27, so that the surface tension of the water within the chamber 50 permits the water level to rise appreciably above the open upper level of the discharge duct 46. Finally when the level of the water rises sufficiently above the opening of the discharge duct 46, the water surface tension breaks and a momentary flood of water fills the siphon discharge duct 46 and initiates the siphoning action which continues until the water level within the float tank 20 falls below the open bottom 53 of the siphon chamber 50.

The size of the opening of the discharge duct 46 is preferably sufficient to permit draining of the float tank 20 at a greater rate than water may be renewed through the inlet valve 27, and also to permit sufficiently rapid draining of the tanks 20 and 22 so that the scum and sludge will be swept through the pipe 23, into the bottom opening 53 of the chamber 50, and into the upper opening of the discharge duct 46. A large variation in the size of the discharge duct 46 is permitted. The minimum size of the duct 46 will obviously be determined by the rate of flow through the inlet valve 27 when the float 37 is at the depressed position. A maximum limit on the size of the discharge duct 46 will be determined by the surface tension of the water, since the momentary flood of water as described above through the inlet opening of the discharge duct 46 must momentarily exceed the capacity of that duct in order to initiate the siphoning action. For this reason, it is important that the inlet opening of the duct 46 be essentially horizontal to permit an effective temporary surface tension damming as above described.

When the water level within the tank 20 falls sufficiently, the buoyant pressure on the float 37 will be released and the frictional force, which had previously held the cam 41 in the float depressing position against the float arm 36, will be released. The handle 45 will fall of its own weight and return the cam 41 to the float releasing position shown in the solid lines Fig. 2. Finally, after the tank 20 and tray 22 have been thoroughly flushed and drained, the water level within the tank 20 will fall below the bottom opening 53, allowing air into the siphon chamber 50 and stopping the siphoning actions. The incoming water through the inlet valve 27 will then refill the float tank 20 and humidifier tray 22 to the normal operating water level 54.

It is to be noted that the chamber 50 presents an elongated oval appearance from either the top or bottom views. This shape provides a refinement over a cylindrical siphon chamber inasmuch as the ratio of the periphery around the bottom opening 53 to the cross sectional area thereof is thereby increased. With flushing apparatus of sufficiently large size and with water of sufficient purity, a cylindrical chamber having a closed top and an open bottom may be suitably secured to the discharge duct 46 in essentially the same manner as the chamber 50.

In other instances, particularly where large concentrations of impurities in the water appreciably increase its surface tension, or where a humidifier flushing apparatus of small size is employed, it has been found that the capillary attraction between the water surface and the lower edge of the chamber 50 prevents a sharp stoppage of the siphoning action even after the water level falls below the level of the lower opening 53. In such an instance, the capillary attraction between the water surface and the edge 53 will raise the water in a ring around the chamber 50 and permit the water level in the tank 20 to drop appreciably below the opening 53 without stopping the siphoning action. If the rate of the inflowing water through the inlet valve 27 is almost enough in itself to satisfy the minimum requirements necessary to maintain the siphoning action, a small break in the seal between the water level and the periphery of the opening 53 will momentarily break the siphoning action, but before the water can drain completely out of the discharge duct 46 so as to prevent a resumption of the siphoning action, the incoming water through the valve 27 will raise the water level in the tank 20 sufficiently to reestablish contact between the periphery of the opening 53 and the level of the water.

As a result, the siphoning process will continue spasmodically for a prolonged period of time. It has been found that by enlarging the peripheral area around the opening 53 as by the elongated, oval shape shown, the breaking of the seal between the water surface and the bottom of the opening 53 is facilitated, so that the siphoning action will stop abruptly when the water level falls below the opening 53.

Fig. 4 shows a modified siphon, similar in structure and function to the siphon already described, wherein the discharge duct 46A has the threaded portion 49A extended through the bottom of the tank 20A and secured thereto by the nut 43A screwed on the threaded extension 49A. In this instance a cylindrical siphon chamber 50A is positioned over the discharge tube 46A with their respective longitudinal axes parallel but eccentric to each other so that their side portions are in contact along a vertical line of tangency 51A whereat the duct 46A and chamber 50A are attached as by welding or soldering.

The top 52A of the chamber 50A is completely closed, whereas the bottom thereof is completely open and provides the vertically serrate periphery 53A. It has been found that serration of the bottom of the opening 53A also facilitates breaking the seal with the water surface as the latter drops below the level of the opening 53A. Without being limited to a particular theory explaining the physical operation of the serrate edge 53A in breaking the seal with the water surface and permitting an abrupt stoppage of the siphoning action, it is believed that the sharp downward projections of the serrate edge 53 afford such a relatively small area of contact with the water surface that the capillary force therebetween is not sufficiently strong to maintain the water seal when the water level drops below the serrate edge 53A.

Figs. 5 through 8 show another embodiment of the present invention and which is adapted for automatic or semi-automatic flushing and draining of a reservoir. Similarly, to the arrangement shown in Figs. 1 through 3, a float tank 61 is connected to an evaporator tray 62 by means of a pipe connection 63. The float tank 61 is provided with a removable cover 64 and a water inlet duct 65 leading into the tank 61 and providing a screw-threaded external projection for attachment to the tank 61 at a leakproof connection by means of the nut 66. On the inside of the tank 61, the duct 65 leads to an inlet jet 67 which extends horizontally into the tank 61 and opens adjacent the horizontally movable arm 68. The leftward extension of the plunger arm 68 is preferably provided with a rubber or rubber-like pad for opening or closing the orifice of the jet 67. The particular type of float controlled jet valve utilized in the present illustration is well known to the art and is accordingly only briefly described herein, it being apparent that other float controlled valves may also be employed with the present invention.

Similar to the float 37 shown in Figs. 1 through 3, the float 69, having the horizontally extending float arm 70, is provided for the float tank 61. The arm 70 provides the upward extending projection 71 which is pivotally mounted at 72 to the left end of the horizontal screw-threaded pivot support 73. The uppermost end of the arm 71 is pivotally secured at 74 to the right end of the horizontally movable plunger 68. The screw-threaded pivot support 73 is engaged in worm driving relationship with the internally screw-threaded spool 75 which latter provides the knurled end portions 76 and 77. The small portion of the spool 75 is journaled in the downward extension 78 of the U-bracket 79, which has its other downward extending arm 80 secured to the side of the tank 61.

By turning the knurled end pieces 76 and 77, the threaded pivot support 73 may be moved to the left or right, Fig. 6, to permit horizontal adjustment of the position of the pivot 72 and thereby to determine the water level at which the float controlled plunger 68 will close the opening of the jet 67.

A second U-bracket 81, Fig. 5, has its flat U-base secured to the downward projecting arm 80 and provides the parallel extending arms 82 and 83 which project inwardly into the tank 61 and lie in spaced vertical planes on either side of the bracket 79. The shaft 84 extends horizontally essentially perpendicularly through and is pivotally mounted in the vertical side portions 82 and 83. One end of the shaft 84 projects through the side of the tank 61 for connection with the weighted handle 85 which normally hangs straight down under the pull of gravity. Parallel to and laterally adjacent the bracket side portion 83, and secured to the other end of the shaft 84, is the spiral-like cam 86. The latter provides the radially extending segment or stop 87 having its opposite ends spaced between a single 360° turn of the spiral.

The plunger 68 provides the horizontal and laterally projecting boss 88 which extends across the edge of the cam 86, Figs. 5 and 8, so as to be in contact with or at least almost in contact with the adjacent portion of the cam 86 when the latter is in the position shown, Fig. 6, and when the plunger 68 is at the leftward position required to completely close the orifice of the jet 67. The portion of the boss 88 adjacent the cam 86 provides a horizontal flat portion adapted to contact the radial stop 87 and limit the counter-clockwise rotation of the cam 86.

The shaft 84 is freely rotatable and is rigidly connected to both the handle 85 and cam 86 for rotation thereof. The radial segment 87 extends vertically downward when the weighted handle 85 hangs free, Fig. 6. In the position of the cam 86, Fig 6, the horizontal cam radius extending toward the boss 88 is appreciably less than the vertically downward radius of the inner spiral. Thus with the water level in the tank 61 at the normal operating level, Fig. 6, i. e., the position of closure of the orifice of the jet 67, the boss 88 will be adjacent the spiral face of the cam 86.

Upon counter-clockwise rotation of the cam 86 to the limit permitted by the radial stop 87, Fig. 7, the boss 88 will be moved to the right by contact with the spiral edge of the cam 86. Movement of the boss 88 to the right in Fig. 6 pivotally depresses the float arm 70 and partially opens the orifice of the jet 67. The water level in the tank 61 will then gradually rise above the upper opening of the discharge duct 89 and commence the siphoning discharge action, similarly as described above, which will continue until the water level falls below the opening 93 of the siphon chamber 90. The siphon apparatus in the instant illustration has the screw-threaded portion 91 of the discharge duct 89 extended through the bottom of the float tank 61. The siphon chamber 90 is cylindrical, has the closed top 92, and opens at its lower portion 93 above the base of the tank 61.

Details of the siphon construction in the present embodiment are shown in section, Fig. 11, wherein the chamber 90 is secured to the duct 89 along a line of tangency. The upper portion of the duct 89 bends away from the adjacent side of the chamber 90 to centrally locate the horizontal inlet opening of the discharge duct 89 within the chamber 90 and slightly below its closed top 92. This feature is a particular refinement in the construction since it permits a simplified support for the chamber 90, yet spaces the inlet opening of the duct 89 from the sides of the chamber 90. It has been found that the type of construction shown in Figs. 3 and 4, wherein portions of the inlet opening of the discharge duct are adjacent the sides of the siphon chamber, frequently interferes with the surface tension damming of the water around the inlet opening of the discharge duct. Thus, instead of damming the rising water around the inlet opening of the discharge duct and releasing it in a momentary flood to initiate the siphoning action, the water trickles over the edge of the discharge duct inlet opening at the points of contact thereof with the siphon chamber as fast as the water enters the float tank. As a result the capacity of the discharge duct is never exceeded and the siphoning action never starts. For this reason, where a discharge duct of relatively large capacity is employed, the type of construction shown in Fig. 11 is preferred.

The serrations shown at 53A in Fig. 4 may also be provided in the construction disclosed in Fig. 11.

Also, similarly to the embodiment of the present invention previously described, rotation of the handle 85 to the horizontal float-depressing position, Fig. 7, against the buoyancy of the water at the normal operating level, tightly presses the curved edge of the cam 86 against the boss 88. Free movement of the cam 86 is thus prevented by friction contact with the boss 88, and the handle 85 is prevented from falling merely of its own weight to the vertically downward position. The lowering of the water level upon commencement of the siphoning action releases the friction contact between the cam 86 and boss 88, permitting the handle to drop and return the cam 86 to the position shown in Fig. 6. Upon completion of the siphoning action, the tanks 61 and 62 will have been flushed and drained of accumulated water impurities as described above, and the float 69 will be at its lowered position with the orifice of the jet 67 open to permit rapid refilling of the tanks 61 and 62 to the normal operating level at which the jet 67 will be closed by the end of the plunger 68.

It is to be noted that the construction of the horizontal jet 67 and plunger 68, cooperable with the upward projection 71 of the float arm 70 is particularly advantageous and permits the water inlet orifice of the jet 67 to be conveniently located above the water level within the tank 61. If the inlet water pressure behind the jet 67 should drop for any reason, danger of siphoning the water from the tank 61 back through the jet 67 is completely avoided. Thus the construction shown provides an anti-siphoning inlet valve arrangement which is particularly suitable for use in float controlled humidifier applications.

In normal operation of the humidifier, only a slow flow of water will enter the float tank 61 through the jet 67 at a rate sufficient to compensate for evaporation of water from the evaporator pan 62. Inasmuch as the jet 67 is above the normal water level, evaporation of incoming water trickling down the sides of the jet 67, in the course of time, results in an accumulation of corrosive salts and other undesirable precipitate around the jet 67 and valve fittings, impairing their function and being particularly damaging to the brass fittings of the jet 67 and valve accessories. The inlet flow of water through the jet 67 is never sufficient to clean the latter during the normal course of operation.

By virtue of the present invention, when the siphoning action provided for by the discharge duct 89 stops, and the plunger 68 is moved the maximum extent to the right in Fig. 6, the orifice of the jet 67 will be wide open. The inrushing water through the jet 67 strikes the end of the plunger 68 and bounces back around the sides of the jet 67 with considerable force to wash the jet 67 and the adjacent valve parts clean of the accumulated salts and precipitate which would otherwise corrode the said jet and valve fittings.

Figs. 9 and 10 show two simple alternate means for initially depressing the float so as to initiate the above described siphoning action. A slightly different valve support and adjusting mechanism is shown in Figs. 9 and 10, although the inlet valve means shown in Figs. 1 through 8 may be employed with the float tank of Figs. 9 and 10. The water level regulating mechanism shown in Figs. 9 and 10 may also be satisfactorily employed with the tanks shown in Figs. 1 through 8. Likewise it will be obvious that the means shown in Figs. 9 and 10 for depressing the float, or the float depressing means previously shown, may be suitably employed with any of the water level regulating means described herein or with other types of suitable water level regulating means.

For the purpose of illustration, both embodiments of the present invention shown in Figs. 9 and 10 provide the float tank 100 which is connected to the evaporator tray 101 by the pipe connection 102. An inlet duct 103 projects through the side of the tank 100 and is pivotally secured thereto at a leakproof seal by means of the bolt and washer assembly 104. On the inside of the float tank 100, the inlet duct 103 leads to an inlet valve 105, not shown in detail herein, and which is opened and closed by lateral movement of the plunger 106. The end of the plunger 106 opposite the valve 105 is pivotally secured at 107 to the upward extension 108 of the float arm 109. The upward extension 108 is pivotally supported at 110 for pivotal movement upon the rising or falling of the float 111.

The bracket 112 provides the downward extending arm 113 which is secured to one side of the float tank 100. The other downward extending arm 114 of the bracket 112 provides an opening, not shown, within which the screw-threaded pivot supporting shaft 115 is horizontally movable. Horizontal adjustment of the pivot supporting shaft 115 and the pivot 110 supported thereby is effected upon adjusting the knurled nut 116, which is spaced from the bracket arm 114 by the washer 117, and the retaining nut 118, which is spaced from the bracket 114 by the lock washer 119. The siphoning action of the embodiment shown in Figs. 9 and 10 is effected by siphoning means similar to those previously described and include the siphon discharge duct 120, projected through the bottom of the float tank 100 at a leakproof seal, and the inverted siphon chamber 121, which latter is mounted over the duct 120 with its bottom opening spaced above the bottom of the float tank 100.

The apparatus of Fig. 9 provides the removable float tank cover 122 having the central opening 123 for the vertical shaft 124. The lower end of the shaft 124 provides the horizontal pad 125 which is normally supported in a raised position directly over the float 111 by the spring 126, the latter being secured to the cover 122, as by the rivets 127. The free end of the spring 126 opposite the rivets 127 is slidably connected to the shaft 124 by the two pins 128, above and below the spring 126 and embedded within the shaft 124. Pressure on the button head 129 will force the shaft 124 downward against the resilient spring pressure, depressing the float 111 and opening the valve 105. Upon raising of the water level within the float tank 100 above the inlet opening of the discharge siphon duct 120, the siphoning action is initiated to flush, drain, and refill the tanks 100 and 101 essentially as previously described.

In order to initiate the siphoning action with the apparatus shown in Fig. 9, it is necessary to hold the button 129 in the downward float-depressing position until the siphoning action commences. When the button 129 is released, the spring 126 returns the button 129 to the raised float releasing position.

Fig. 10 shows a still more simplified float-depressing means wherein the removable cover 130 provides the slotted opening 131 for the pivotally mounted dog-leg lever 132 which is pivotally connected at 133 to the bracket 134 for pivotal movement about a horizontal pivot axis within the limits permitted by the slot 131. The bracket 134 is depended from the removable cover 130. The upper end 135 of the lever 132 is angularly disposed thereto in the plane of the lever's pivotal movement and is sufficiently weighted to pivotally raise the lower extension of the lever 132 above the top of the float 111, as shown in solid lines, Fig. 10.

It is apparent that proper adjustment of the linkage between the float 111 and the valve 105 permits closure of the latter at the desired operating water level which buoys the float 111 within the pivotal radius of the lower portion of the arm 132. Thus when the weighted lever 135 is pivotally raised to the position shown in phantom, Fig. 10, the float 111 will be forced downward into the water within the tank 100. Friction contact between the lower portion of the lever 132 and the top of the float 111 prevents the weighted handle 135 from returning to its float releasing position.

As a result of pivoting the weighted handle 135 to the float-depressing position shown in broken lines, Fig. 10, the valve 105 opens, the water level within the tank 100 rises above the opening at the top of the discharge duct 120, and the above described siphoning action is initiated.

Upon lowering of the water level sufficiently to release the pressure and friction contact between the float 111 and the lower end of the arm 132, the latter pivots under its own weight to the float releasing position, and the float depressing apparatus is thereby automatically reset for the next operation. Although Fig. 10 shows the arm 132 adapted to depress the float 111 by contact with the upper surface thereof, the same float depressing action may obviously be achieved by adapting the arm 132 to contact and depress the float arm 109 upon raising the lever 135. This latter construction is frequently preferred in the situation wherein the top of the float 111 does not present a flat or suitable surface for engagement by the lever 132.

With the exception of the embodiment shown in Fig. 9, the various modifications of the present invention permit an automatic flushing, draining, and refilling of the float tank and any tank associated therewith upon the initial tripping of a float depressing lever. The lever is then automatically held in the float depressing position until after commencement of the siphoning action which drains the float tank and permits automatic resetting of the float depressing mechanism.

For certain purposes, a completely automatic means for initiating the siphoning action at periodic intervals is desirable. This is accomplished in the present invention, utilizing any of the siphoning arrangements shown, by providing a seepage inlet valve which is never completely closed by operation of the float mechanism, as shown in Fig. 2. Thus when the float is in the raised position at which the inlet valve would normally be closed, a slow seepage of water into the float tank will gradually raise the water level therein. In the course of a day or a week or other suitable time interval, the water in the float tank will overflow the siphon discharge duct and initiate the siphoning action which then operates as above described.

By the foregoing, applicant has disclosed a novel siphon operated flushing apparatus which is particularly suited for automatic or semi-automatic flushing, draining, and refilling of humidifier float tanks and/or associated humidifier evaporator trays, although the principles of the present invention may be readily employed with other liquid reservoirs wherein periodic flushing, draining, and refilling is desirable.

I claim:

A liquid supply and flushing device adapted for use with a humidifier, comprising a float tank having a float control therein operatively connected with a liquid inlet control valve to maintain liquid at an operating level in said tank, means for connecting said float tank to the humidifier, and apparatus for breaking and flushing accumulated sludge and scum from said tank by raising the level of said liquid to a discharge level substantially above said operating level including means for depressing the float control member in said float tank against the buoyancy of said liquid at said operating level, and discharge means operated in response to the rising of said liquid to said discharge level for rapidly discharging said liquid and accumulated sludge and scum from said tank, said discharge means comprising a siphon operatively disposed for draining the liquid from said tank and having its highest level at said discharge level, said siphon including a siphon chamber within said tank and opening near the bottom thereof and a discharge duct having a substantially horizontal intake opening within said siphon chamber at said discharge level and having a discharge opening outside of said tank and below the opening of said siphon chamber, said siphon chamber being eccentrically and tangentially secured to a side portion of said discharge duct and the upper portion of said discharge duct being inclined away from the adjacent side of said siphon chamber so that said upper portion is spaced from said siphon chamber.

EDWARD W. BOTTUM.

References Cited in the file of this patent

UNITED STATES PATENTS

| Number | Name | Date |
|---|---|---|
| 283,105 | Henderson | Aug. 14, 1883 |
| 429,494 | Anderson | June 3, 1890 |
| 474,372 | Dearborn | May 10, 1892 |
| 540,042 | Bowerman | May 28, 1895 |
| 743,618 | Connor | Nov. 10, 1903 |
| 807,914 | Dugmore | Dec. 19, 1905 |
| 1,091,834 | Goreau | Mar. 31, 1914 |
| 1,225,691 | Williams | May 8, 1917 |
| 1,238,771 | Howes | Sept. 4, 1917 |
| 1,306,285 | Sigouin | June 10, 1919 |
| 1,699,824 | Van Deusen | Jan. 22, 1929 |
| 1,952,000 | Skuttle | Mar. 20, 1934 |
| 2,068,252 | Weber | Jan. 19, 1937 |
| 2,133,599 | Turney | Oct. 18, 1938 |
| 2,155,698 | Zinkil | Apr. 25, 1939 |